Figure 1:
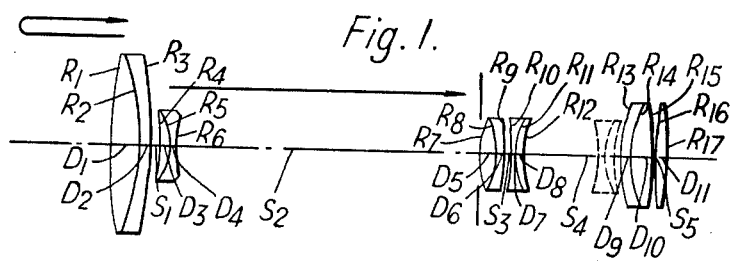

Sept. 21, 1965    G. H. COOK    3,207,841
CAMERA ARRANGEMENTS, FOR EXAMPLE FOR TELEVISION
Filed July 14, 1960    4 Sheets-Sheet 1

Inventor
GORDON H. COOK
By Holcombe, Wetherill + Brisebois
Attorneys

Sept. 21, 1965   G. H. COOK   3,207,841
CAMERA ARRANGEMENTS, FOR EXAMPLE FOR TELEVISION
Filed July 14, 1960   4 Sheets-Sheet 2
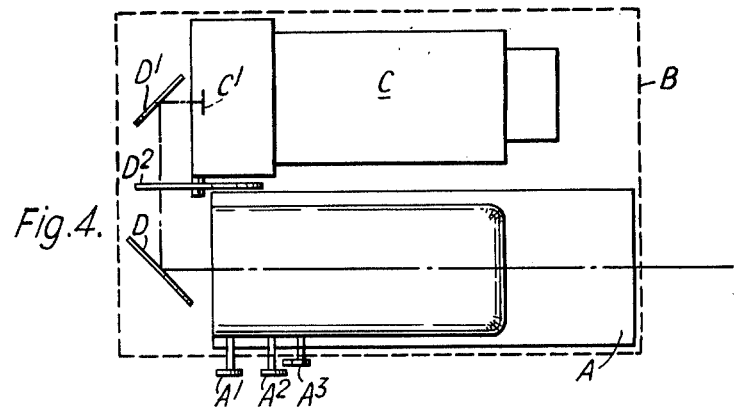
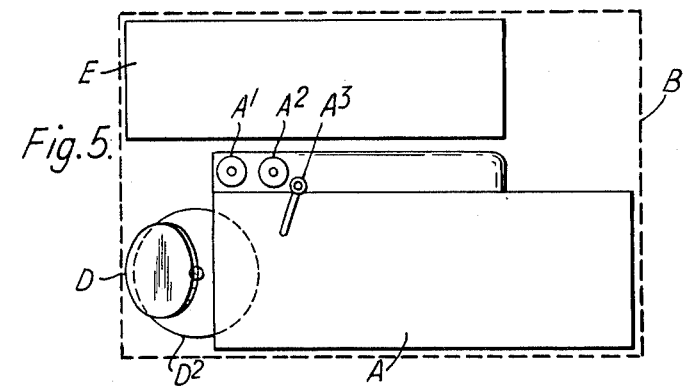
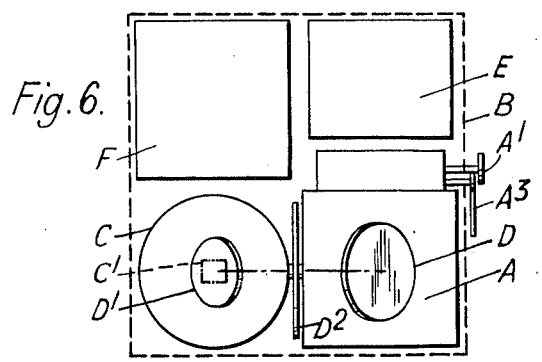
Inventor
GORDON H. COOK
By
Holcombe, Wetherill + Brisebois
Attorneys Sept. 21, 1965　　　　　G. H. COOK　　　　　3,207,841
CAMERA ARRANGEMENTS, FOR EXAMPLE FOR TELEVISION
Filed July 14, 1960　　　　　　　　　　　　4 Sheets-Sheet 3
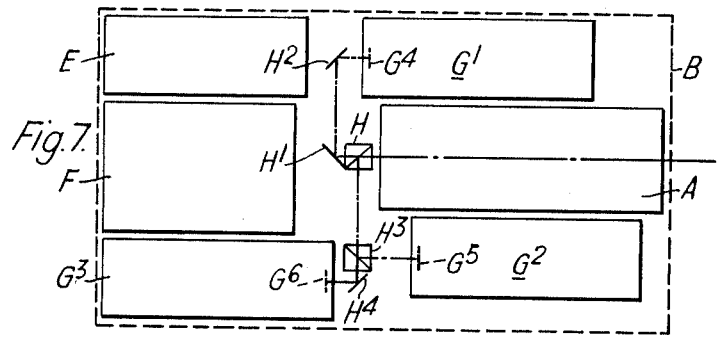
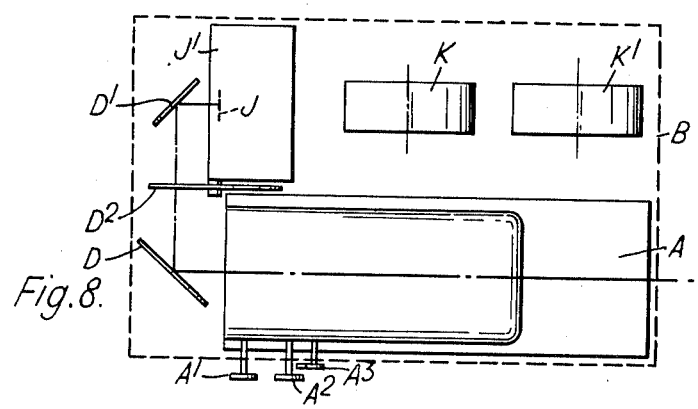
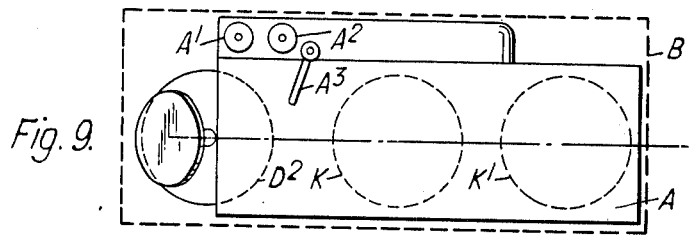
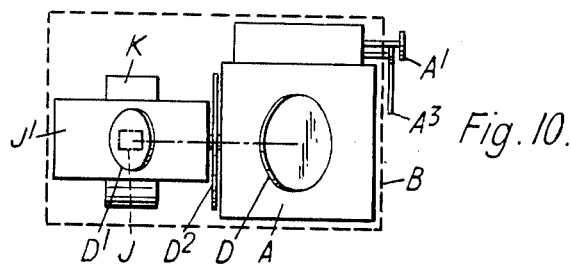
Inventor
GORDON H. COOK
By
Holcombe, Wetherill & Brisebois
Attorneys Sept. 21, 1965  G. H. COOK  3,207,841
CAMERA ARRANGEMENTS, FOR EXAMPLE FOR TELEVISION
Filed July 14, 1960  4 Sheets-Sheet 4

*Inventor*
GORDON H. COOK
By
Holcombe, Wetherill, Brisebois
*Attorney*

3,207,841
CAMERA ARRANGEMENTS, FOR EXAMPLE
FOR TELEVISION
Gordon Henry Cook, Leicester, England, assignor to The
  Rank Organisation Limited, London, England, a British
  company
Filed July 14, 1960, Ser. No. 42,847
Claims priority, application Great Britain, July 14, 1959,
  24,156/59; Jan. 14, 1960, 1,412/60
The portion of the term of the patent subsequent to
  Mar. 18, 1980, has been disclaimed
21 Claims. (Cl. 178—5.4)

This invention relates to a camera arrangement, for example for television wherein use is made of a variable focal length optical objective for projecting an image of an object on to a generally rectangular image-receiving area in a stationary image plane, the objective being of the type commonly known as the "zoom" type, that is one having relatively movable members whereby the equivalent focal length of the objective can be varied whilst maintaining constant position of the resultant image plane of the objective throughout the range of relative movement. Known optical objectives of this type frequently have front and rear assemblies, of which the front assembly includes the relatively movable members and the rear assembly is stationary.

It should be made clear that the terms "front" and "rear" are herein used, in accordance with the usual convention, to relate to the sides of the objective respectively near to and further from the longer conjugate.

In known television camera arrangements, employing an ordinary photographic objective or alternatively a set of interchangeable objectives of different equivalent focal length mounted in a turret, it is customary to mount the objective or the turret on the front end of the television camera casing containing the orthicon or other signal-generating tube and the associated electrical equipment. When an objective of the zoom type is similarly mounted on the front of the television camera casing, its bulk and great axial length involve so long and bulky a projection in front of the casing as to make the arrangement very inconvenient for practical use.

This problem is made still more acute when various exacting requirements, often called for a suit practical needs, are to be fulfilled. For instance, in order to make the camera readily adaptable to different conditions of use, it is often desired so to arrange the objective as to provide two (or more) different ranges of variation of equivalent focal length. One known way of achieving this is to provide two (or more) interchangeable stationary rear assemblies for use with the same front assembly, but this presents obvious inconveniences.

Another desirable practical requirement is so to arrange the objective as to provide a long back focal distance between the rear surface of the rear assembly and the resultant image plane, in order to provide adequate space for accommodating filter devices or reflectors or other pieces of apparatus between the objective and the image plane. Such long back focal distance is readily obtainable when the values of the equivalent focal length in the range of variation are high relatively to the size of the rectangular image-receiving area, but the majority of variable focal length objectives have back focal distances inadequate for such purposes, with lower values of equivalent focal length in the range of variation.

In one proposal for meeting a similar difficulty in a colour camera arrangement employing a group of alternative objectives of different equivalent focal length mounted on a turret, space for accommodating the colour filters and beam-splitting devices for transmitting the colour partial images to the three image-receiving devices is afforded by means of a copying objective behind the primary image plane of the objectives for relaying the image therefrom to the secondary image plane of the three image-receiving devices, a field lens being provided in the primary image plane for forming an image of the diaphragm of the main objectives in the entrance pupil of the copying objective. If such a relaying system were applied to an objective of the zoom type, it would have the great disadvantage of considerably increasing the already great axial length of the objective system, and an even more serious disadvantage is that the field lens and the copying objective very seriously interfere with satisfactory aberration correction of the complete system.

Although reference has so far been made especially to television cameras, it will be appreciated that difficulties analogous to those above mentioned also apply to cinematograph cameras.

The present invention has for its object to provide an improved camera arrangement, incorporating an objective of the zoom type, whether providing for a single range or for two or more ranges of variation of equivalent focal length, wherein with the aid of an objective having long back focal distance even for relatively low values of equivalent focal length the above mentioned difficulty can be satisfactorily overcome.

The camera arrangement, according to the present invention, comprises a casing, an image-receiving unit having an image-receiving area of generally rectangular shape, an optical objective of variable equivalent focal length, the minimum value $F_0$ of which is not greater than four times the length of the diagonal of the image-receiving area, and having front and rear assemblies of which the front assembly includes members relatively movable for effecting variation of the equivalent focal length of the objective whilst maintaining the resultant image plane constant throughout the range of relative movement, whilst the rear assembly has an inverted telephoto characteristic with effective axial beam diameter greater at its rear surface than at its front surface and includes a stationary convergent rear member having equivalent focal length $f_r$ and in front thereof at least one member which cooperates with the front assembly to form a divergent group whose equivalent focal length bears to the equivalent focal length of the complete objective a constant ratio lying between $f_r/F_0$ and $f_r/3F_0$, such divergent group acting to produce a virtual image of the object in a constant position lying between $f_r$ and $4f_r$ in front of the front surface of the convergent rear member, whereby such rear member always receives a divergent beam and forms from such virtual image a resultant image of the object at a back local distance behind the rear surface of the convergent rear member greater than six times the length of the diagonal of the image-receiving area, means for mounting the image-receiving unit and the optical objective side by side within the camera casing with the image-receiving area at the rear end of the image-receiving unit, and means for deflecting the image-forming beam emergent from the rear surface of the objective to cause it to be incident on the image-receiving area at an effective distance from the rear surface of the objective equal to the back focal distance of the objective.

Preferably, in the mid-position of the relative movements (that is in the position in which the value of the equivalent focal length of the objective is equal to the geometric means between its minimum and maximum values), the rear nodal point of the divergent group in front of the rear convergent member of the rear assembly is axially separated from the front nodal point of such rear member by a distance lying between $+f_r$ and $-f_r/3$, such axial separation being reckoned positive if the rear nodal point of the divergent group lies in front of the front nodal point of the rear member and negative if the said rear nodal point lies behind the said front nodal point.

A preferred construction for the objective is that forming the subject of the present applicant's copending United States patent application Serial No. 42,941 filed on July 14, 1960, now Patent 3,081,671. In such objective, the rear assembly includes a stationary convergent rear member, and a divergent member located in front thereof and adjustable from one to the other of two preset positions in which such divergent member has the same conjugates, whereby in such two preset positions of the divergent member, the relative movement of the members of the front assembly will produce two different ranges of variation of the equivalent focal length of the complete objective with the same position of the image plane, the magnifications of the adjustable divergent member of the rear assembly in its two preset positions respectively being $\sqrt{M}$ and $1\sqrt{M}$, where M is the ratio between the equivalent focal lengths of the object in the two ranges. The rear assembly usually includes a stationary front member in addition to the adjustable divergent member and the stationary rear member. It should be made clear that, with the arrangement of such copending application, the rear assembly has an inverted telephoto characteristic for the lower of the two ranges of variation of the equivalent focal length and a telephoto characteristic for the higher range.

The parts within the camera casing may be arranged in a variety of ways to suit requirements of particular uses. Thus, it will often be convenient to mount a sighting or view-finding device in the casing by the side of the objective and the image-receiving unit. Again, in the case of a television camera, wherein the image-receiving unit will consist of a signal-generating tube acting to generate electrical signals in accordance with the received optical image, it will often be convenient to mount by the side of such tube and the objective a unit incorporating the electrical equipment associated with the tube. Thus, in one convenient arrangement, four units, respectively comprising the objective, the signal-generating tube, the associated electrical unit and the sighting device may be mounted side by side in approximately square formation within the casing.

In a further alternative, for operation in colour, the objective may be associated with three colour-partial image-receiving units each with its own image-receiving area, at least one of such units being mounted by the side of the objective in the manner above described, beam-splitting devices and colour filters being so accommodated between the rear surface of the objective and the three image-receiving areas as to give equal effective optical path lengths from such rear surface to such image-receiving areas.

The invention is especially suitable for use in conjunction with the invention forming the subject of the present applicant's copending United States patent application Serial No. 78,744, filed on December 27, 1960, now Patent 3,164,664, according to which, in combination with a variable focal length objective of the kind employed in the camera arrangement according to the present invention, a wide angle attachment is provided which can be placed at will in front of the front assembly of the objective for increasing the angular field and decreasing the values of the equivalent focal length of the objective in accordance with the telescopic power of the attachment without reducing the back focal length of the objective. In such case, the wide angle attachment may conveniently be mounted on the front of the camera casing so that it can be moved at will from an inoperative position to an operative position in front of the front surface of the objective. The wide angle attachment is preferably substantially afocal, and in one convenient construction comprises a divergent compound component axially spaced in front of a convergent compound component. In such case, the clear diameter of the convergent rear component of the attachment preferably lies between 1.0 and 1.25 times the ratio of the maximum value of the equivalent focal length of the objective to the f/number of the objective. The equivalent focal length of such rear component preferably lies between 2.5 and 5.0 times such ratio.

In one convenient arrangement, the convergent rear component of the attachment consists of a doublet having a divergent element in front of a convergent element and having its rear surface concave to the front with radius of curvature between 0.2 and 0.5 times the equivalent focal length of the component. The internal contact in this rear component, whether convex or concave to the front, conveniently has radius of curvature greater than 2.0 times the equivalent focal length of the component, the mean refractive index of the material of the divergent front element exceeding that of the convergent rear element by between 0.05 and 0.20.

The divergent front component of the attachment may conveniently consist of a doublet having a convergent element in front of a divergent element and having its rear surface convex to the front with radius of curvature between 0.25 and 0.6 times the equivalent focal length of such front component. The internal contact in this front component may conveniently be concave to the front with radius of curvature between 0.5 and 2.0 times the equivalent focal length of the component, the mean refractive index of the material of the convergent front element exceeding that of the divergent rear element by between 0.1 and 0.25.

Preferably, in each of the two components of the attachment, the Abbé V number of the material of the front element exceeds that of the rear element by at least 20.

It should be made clear that the term "internal contact" when used herein in connection with a compound component, is to be understood to include, not only a cemented internal contact surface, but also what is often known as a "broken contact," that is an arrangement in which the two contacting surfaces have slightly different radii of curvature. In such case, the effective radius of curvature of the broken contact is the arithmetic mean between the radii of curvature of the two constituent surfaces, and the effective power thereof is the harmonic mean between the powers of the two surfaces.

The invention may be carried into practice in various ways, but some convenient practical constructions of camera arrangement according thereto are illustrated by way of example in the accompanying drawings, in which—

Figure 2:
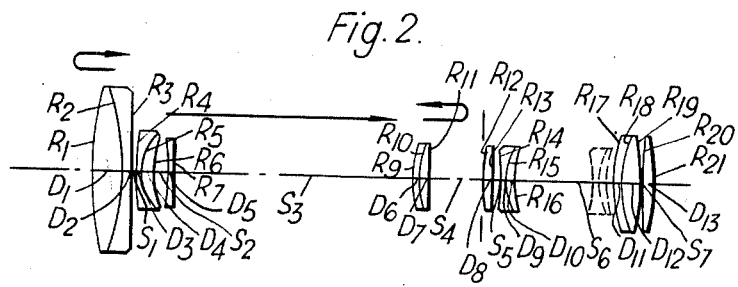
Figure 3:
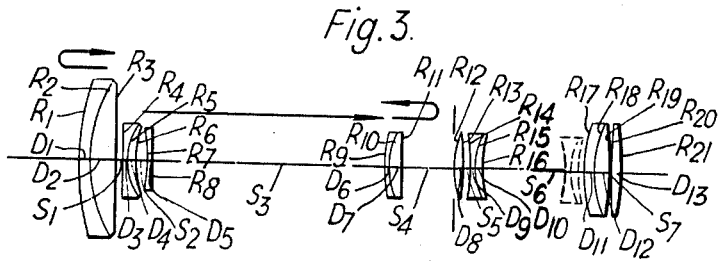
Figure 11:
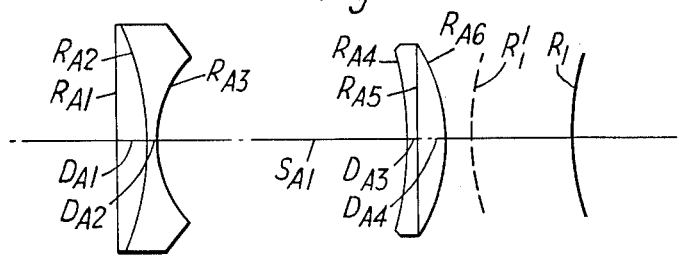
Figure 12:
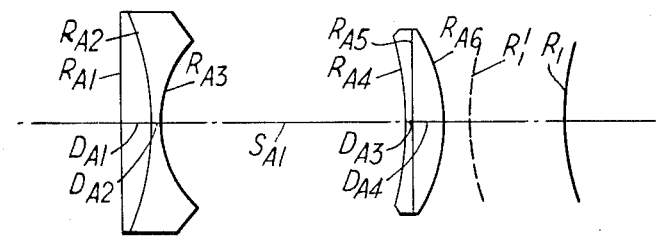
Figure 13:
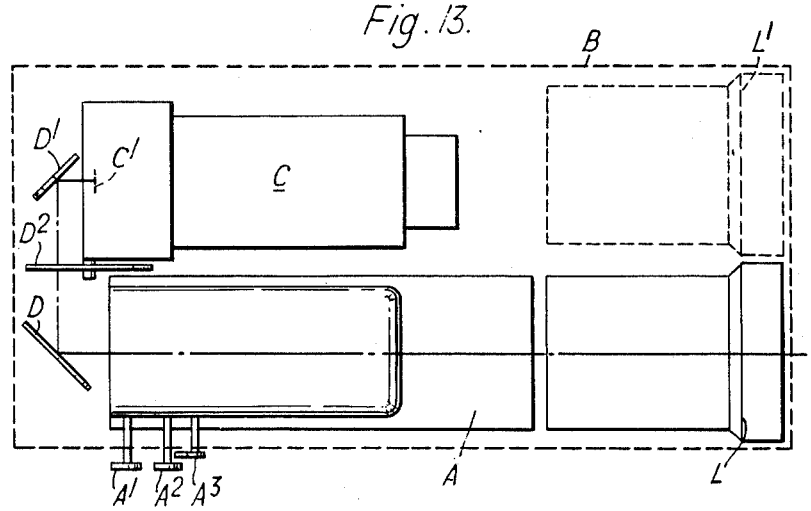

FIGURES 1–3 respectively illustrates three alternative forms of variable focal length objective which may be used in these constructions, FIGURE 4 diagrammatically shows a plan view of the lower part of one construction of television camera, FIGURES 5 and 6 are respectively diagrammatic side and end elevations of the construction of FIGURE 4, FIGURE 7 illustrates an alternative construction for a three-colour television camera, FIGURES 8–10 are views similar to those of FIGURES 4–6 illustrating a cinematograph camera construction, FIGURES 11 and 12 respectively illustrate the optical arrangements of two alternative wide angle attachments intended for use in front of any of the foregoing constructions, and FIGURE 13 shows by way of example such wide angle attachment fitted in front of the construction of FIGURES 4–6.

It should be mentioned that the three examples of variable focal length objective shown respectively in FIGURES 1–3 incorporate the invention of the above-mentioned copending United States patent application 42,941, now Patent 3,081,671, and are in fact identical with the examples given in the specifications of such copending application. The second and third of these examples also incorporate the inventions of a further copending United States patent application Serial No. 53,413 filed on Sept. 1, 1960 and are likewise identical with examples given in the specifications of such application.

Numerical data for these three examples are given in the following tables, in which $R_1R_2$ . . . represent the radii of curvature of the individual surfaces of the objective, the positive sign indicating that the surface is convex to the front and the negative sign that it is concave thereto, $D_1D_2$ . . . represent the axial thicknesses of the elements of the objective and $S_1S_2$ . . . represent the axial air separations between the components of the objective. The tables also give the mean refractive indices $n_d$ for the $d$-line of the spectrum and the Abbé V numbers of the materials used for the various elements, and in addition the clear diameters for the air-exposed surfaces of the objective.

*Example I*

| Radius | Thickness or Air Separation | Refractive Index $n_d$ | Abbé V Number | Clear Diameter |
|---|---|---|---|---|
| $R_1 = +3.6928$ | | | | 1.375 |
| | $D_1 = 0.25$ | 1.6176 | 52.70 | |
| $R_2 = -1.8342$ | | | | |
| | $D_2 = 0.075$ | 1.728 | 28.90 | |
| $R_3 = -5.6398$ | | | | |
| | $S_1 =$ variable | | | |
| $R_4 = -1.2475$ | | | | 0.575 |
| | $D_3 = 0.10$ | 1.7618 | 26.98 | |
| $R_5 = -0.5046$ | | | | |
| | $D_4 = 0.05$ | 1.65301 | 46.16 | |
| $R_6 = +1.6569$ | | | | 0.536 |
| | $S_2 =$ variable | | | |
| $R_7 = +1.2136$ | | | | 0.551 |
| | $D_5 = 0.125$ | 1.50759 | 61.16 | |
| $R_8 = -0.6991$ | | | | |
| | $D_6 = 0.05$ | 1.70035 | 30.28 | |
| $R_9 = -1.4255$ | | | | |
| | $S_3 = 0.05$ or $0.757$ | | | |
| $R_{10} = -1.1767$ | | | | 0.541 |
| | $D_7 = 0.04$ | 1.65695 | 50.81 | |
| $R_{11} = +0.4902$ | | | | |
| | $D_8 = 0.08$ | 1.7618 | 26.98 | |
| $R_{12} = +1.1905$ | | | | 0.549 |
| | $S_4 = 0.757$ or $0.05$ | | | |
| $R_{13} = +2.2482$ | | | | 0.793 |
| | $D_9 = 0.0625$ | 1.7618 | 26.98 | |
| $R_{14} = +0.8803$ | | | | |
| | $D_{10} = 0.1875$ | 1.60557 | 60.02 | |
| $R_{15} = -1.7943$ | | | | 0.801 |
| | $S_5 = 0$ | | | |
| $R_{16} = +12.7551$ | | | | 0.798 |
| | $D_{11} = 0.075$ | 1.5097 | 64.44 | |
| $R_{17} = -2.8927$ | | | | |

The dimensions of the variable air spaces in the front assembly are as follows:

| | $S_1$ | $S_2$ |
|---|---|---|
| $F = F_0$ | 0.0750 | 2.3486 |
| $F = \sqrt{F_0 F_m}$ | 1.6200 | 1.6576 |
| $F = F_m$ | 2.3111 | 0.1125 |

The linear dimensions in this table are given in terms of $F_0$, the minimum value of the equivalent focal length $F$ of the objective in the lower range of variation, the maximum value $F_m$ in such lower range being $5F_0$. In the higher range, the minimum and maximum values $F_0^1$ and $F_m^1$ are respectively $2F_0$ and $10F_0$, so that the ratio M between the equivalent focal lengths of the objective in the two ranges is equal to 2.

The relative aperture is $f/4.0$ in the first range and $f/8.0$ in the second range.

The back focal distance is $3.106F_0$.

The iris diaphragm is positioned $0.038F_0$ in front of the surface $R_7$ and its maximum diameter is $0.5425F_0$.

The semi-angular field covered varies from about 11½ degrees at minimum equivalent focal length $F_0$ in the first range to about 2½ degrees at maximum equivalent focal length $F_m$ in the first range, and from about 5¾ degrees at minimum equivalent focal length $F_0^1$ in the second range to about 1¼ degrees at maximum equivalent focal length $F_m^1$ in the second range.

The front assembly in this example comprises a front member in the form of a convergent doublet having equivalent focal length $f_1 = 4.278F_0$ and a rear member in the form of a divergent doublet having equivalent focal length $f_2 = -1.250F_0$. Both these members are movable and these movements are fully described in the specification of the above-mentioned United States Patent Application Serial No. 42,941, now Patent 3,081,671, the divergent rear member moving backwards from its initial position to its final position, during variation of the equivalent focal length F of the objective from its minimum value $F_0$ to its maximum value $F_m$ in the lower range, whilst at the same time the convergent front member first moves forward and then back again to its initial position. The backward movement of the rear member from its initial position is given by the expression $f_2(F-F_0)/\sqrt{F_0 F_m}$, and its total travel in the example is $2.236F_0$. The distance moved by the front member in the forward direction from its initial position is given by the expression $$f_2(F-F_0)(F_m-F)/F\sqrt{F_0 F_m}$$

and the most forward position occurs when F is equal to $\sqrt{F_0 F_m}$, the actual distance in the example being $0.854F_0$. The two members may be interlinked by any suitable mechanism to perform these movements under the control of a zoom control element conveniently mounted outside the casing of the objective.

In the foregoing description of the movements, it has been assumed that the object position remains unchanged at infinity, so that a further movement is required to accommodate change of object position. This can be achieved by superimposing on the movement an additional movement of the front member of the front assembly independently of the rear member of such assembly. This additional movement consists of a forward movement of the front member through a distance equal to $f_1^2/(d_0-f_1)$, where $d_0$ is the distance of the object in front of the front nodal plane of the front member in its position of adjustment. Since this expression is independent of the equivalent focal length F of the complete objective, it will be clear that the main movements of the members of the front assembly to effect variation of equivalent focal length can be carried out in each and every position of adjustment of the front member to suit object distance, without affecting the final image position. This additional movement of the front member is controlled by a focussing control element, and can readily be effected by adjustment of the front member on a carriage which is interlinked with the rear member for the zoom control movement.

The rear assembly comprises a stationary front member, an adjustable middle member and a stationary rear member. The front member consists of a convergent doublet having equivalent focal length $f_f = +1.602F_0$. The middle member consists of a divergent doublet having equivalent focal length $f_m = -F_0$. The rear member consists of a convergent doublet followed by a convergent simple element, and has equivalent focal length $$f_r = +1.438F_0$$

The middle member is adjustable from one to the other of two preset positions, in one of which (as shown in dotted line in the drawing) it is close to the rear member, whilst in the other (as shown in full line) it is close to the front member. In these two positions the magnifications due to the middle member are respectively $\sqrt{M}$ and $1/\sqrt{M}$, and since in the example $M=2$, these magnifications are respectively 1.414 and 0.707. The middle member has the same conjugates in the two positions, the front conjugate distance in one position being equal to the back conjugate distance in the other position. Thus the two conjugate distances are $f_m(1+\sqrt{M})$ and $$f_m(1+\sqrt{M})/\sqrt{M}$$

that is in the example $2.414F_0$ and $1.707F_0$, and the distance between the two positions is equal to the difference between the two conjugate distances, that is $0.707F_0$. In this way, as has already been mentioned, it becomes possible to get two ranges of variation of the equivalent focal length of the objective, with the same image plane and without movement of the front and rear members of the rear assembly.

The second and third examples differ from the first primarily in that the front assembly is differently arranged and incorporates two further features described in the specification of the above-mentioned United States patent application Serial No. 53,413.

According to one of such further features an optical objective of variable focal length has a normally stationary rear assembly and a front assembly including members relatively movable under the control of a zoom control element for effecting variation of the equivalent focal length of the objective whilst maintaining constant position of the final image plane of the complete objective throughout the range of relative movement, such front assembly being substantially afocal throughout the range of movement and comprising three members, of which the front and rear members are convergent and are mechanically interconnected to perform approximately equal and opposite axial movements under the control of a cam mechanism actuated by the zoom control element, whilst the middle member is divergent and is caused to perform an axial movement which bears an approximately linear relationship to the movement of the zoom control element, the movement of the middle member and the movements of the front and rear members being so interrelated as to cause the equivalent focal length of the objective to vary in accordance with an approximately logarithmic law relatively to the movement of the zoom control element.

According to the other of such further features, an optical objective of variable focal length has members relatively movable under the control of a zoom control element for effecting variation of the equivalent focal length of the objective whilst maintaining constant position of the final image plane of the objective throughout the range of relative movement, such relatively movable members including a movable divergent member which is located in front of the diaphragm of the objective and behind at least one other member and receives from the member in front of it a converging beam, the axial travel of such divergent member for the complete range of variation of the equivalent focal length of the objective exceeding the equivalent focal length $f_2$ of the divergent member, the said divergent member comprising a divergent doublet component in front of a simple divergent component, the internal contact in such doublet component being strongly convex towards the front with radius of curvature lying numerically between $0.3f_2$ and $0.6f_2$, whilst the difference between the mean refractive indices of the materials of the two elements of the said doublet component is less than 0.04.

*Example II*

| Radius | Thickness or Air Separation | Refractive Index $n_d$ | Abbé V Number | Clear Diameter |
|---|---|---|---|---|
| $R_1 = +2.3020$ | $D_1 = .2125$ | 1.65695 | 50.81 | 1.274 |
| $R_2 = -2.3020$ | $D_2 = .06875$ | 1.7618 | 26.98 | |
| $R_3 = -25.4945$ | $S_1$ = variable | | | 1.221 |
| $R_4 = +3.0841$ | $D_3 = .04125$ | 1.591 | 54.80 | .603 |
| $R_5 = +.3886$ | $D_4 = .103$ | 1.764 | 32.00 | |
| $R_6 = +.9988$ | $S_2 = .103$ | | | .534 |
| $R_7 = -1.9290$ | $D_5 = .04125$ | 1.691 | 54.80 | .516 |
| $R_8 = +6.2500$ | $S_3$ = variable | | | .511 |
| $R_9 = +1.2025$ | $D_6 = .0375$ | 1.7618 | 26.98 | .524 |
| $R_{10} = +.7318$ | $D_7 = .075$ | 1.5097 | 64.44 | |
| $R_{11} =$ | $S_4$ = variable | | | .518 |
| $R_{12} =$ aspheric | $D_8 = .0625$ | 1.48503 | 70.29 | .518 |
| $R_{13} = -3.8225$ | $S_5 = .05$ or .765 | | | .514 |
| $R_{14} = -1.2174$ | $D_9 = .0375$ | 1.65695 | 50.81 | .508 |
| $R_{15} = +.4909$ | $D_{10} = .075$ | 1.7618 | 26.98 | |
| $R_{16} = +1.1742$ | $S_6 = .765$ or .05 | | | .513 |
| $R_{17} = +2.0886$ | $D_{11} = .05$ | 1.7618 | 26.98 | .742 |
| $R_{18} = +.8273$ | $D_{12} = .175$ | 1.61334 | 57.59 | |
| $R_{19} = -2.0464$ | $S_7 = .0025$ | | | .748 |
| $R_{20} = +10.8029$ | $D_{13} = .075$ | 1.5097 | 64.44 | .745 |
| $R_{21} = -2.5096$ | | | | .743 |

The aspheric surface $R_{12}$ has radius of curvature $+1.8262F_0$ at the vertex and is defined by the equation:
$$x = (1.8262 - \sqrt{3.3348 - y^2}) - .004135y^4 + .2330y^6 - .2541y^8 + 8.9889y^{10}$$

The dimensions of the variable air spaces in the front assembly are as follows:

|  | $S_1$ | $S_3$ | $S_4$ |
|---|---|---|---|
| $F = F_0$ | .0375 | 1.88225 | .42738 |
| $F = \sqrt{F_0 F_m}$ | 1.31225 | 1.31225 | .075 |
| $F = F_m$ | 1.88225 | .0375 | .42738 |

*Example III*

| Radius | Thickness or Air Separation | Refractive Index $n_d$ | Abbé V Number | Clear Diameter |
|---|---|---|---|---|
| $R_1 = +1.9964$ |  |  |  | 1.25 |
|  | $D_1 = .0625$ | 1.7618 | 26.98 |  |
| $R_2 = +1.0349$ |  |  |  |  |
|  | $D_2 = .2125$ | 1.6177 | 49.78 |  |
| $R_3 = -19.1161$ |  |  |  | 1.205 |
|  | $S_1$ = variable |  |  |  |
| $R_4 = +5.9363$ |  |  |  | .578 |
|  | $D_3 = .0375$ | 1.691 | 54.80 |  |
| $R_5 = +.4401$ |  |  |  |  |
|  | $D_4 = .075$ | 1.7174 | 29.51 |  |
| $R_6 = +1.0484$ |  |  |  | .522 |
|  | $S_2 = .075$ |  |  |  |
| $R_7 = -1.6614$ |  |  |  | .514 |
|  | $D_5 = .0375$ | 1.691 | 54.80 |  |
| $R_8 = +10.1010$ |  |  |  | .518 |
|  | $S_3$ = variable |  |  |  |
| $R_9 = +1.1659$ |  |  |  | .528 |
|  | $D_6 = .0375$ | 1.7618 | 26.98 |  |
| $R_{10} = +.71014$ |  |  |  |  |
|  | $D_7 = .075$ | 1.5097 | 64.44 |  |
| $R_{11} =$ |  |  |  | .522 |
|  | $S_4$ = variable |  |  |  |
| $R_{12} =$ aspheric |  |  |  | .522 |
|  | $D_8 = .0625$ | 1.48503 | 70.29 |  |
| $R_{13} = -3.8536$ |  |  |  | .518 |
|  | $S_5 = .05$ or .7716 |  |  |  |
| $R_{14} = -1.2288$ |  |  |  | .512 |
|  | $D_9 = .0375$ | 1.65695 | 50.81 |  |
| $R_{15} = +.4955$ |  |  |  |  |
|  | $D_{10} = .075$ | 1.7618 | 26.98 |  |
| $R_{16} = +1.1848$ |  |  |  | .517 |
|  | $S_6 = .7716$ or .05 |  |  |  |
| $R_{17} = +2.1073$ |  |  |  | .748 |
|  | $D_{11} = .0425$ | 1.7618 | 26.98 |  |
| $R_{18} = +.8350$ |  |  |  |  |
|  | $D_{12} = .15$ | 1.61334 | 57.59 |  |
| $R_{19} = -2.0653$ |  |  |  | .751 |
|  | $S_7 = .0025$ |  |  |  |
| $R_{20} = +10.9880$ |  |  |  | .749 |
|  | $D_{13} = .0625$ | 1.5097 | 64.44 |  |
| $R_{21} = -2.5082$ |  |  |  | .747 |

The aspheric surface $R_{12}$ has radius of curvature $+1.8431F_0$ at the vertex and is defined by the equation:
$$x = (1.8431 - \sqrt{3.3970 - y^2}) - .01782y^4 + .2107y^6 + .8772y^8 - 1.8819y^{10}$$

The dimensions of the variable air spaces in the front assembly are as follows:

|  | $S_1$ | $S_3$ | $S_4$ |
|---|---|---|---|
| $F = F_0$ | .0375 | 1.8264 | .41675 |
| $F = \sqrt{F_0 F_m}$ | 1.2736 | 1.2736 | .075 |
| $F = F_m$ | 1.8264 | .0375 | .41675 |

In these two tables, again, the linear dimensions are given in terms of $F_0$, the minimum value of the equivalent focal length F of the objective in the lower range of variation. The maximum value $F_m$ in such lower range is $5F_0$, and the minimum and maximum values $F_0^1$ and $F_m^1$ in the higher range are respectively $2F_0$ and $10F_0$.

The relative aperture of the objective is $f/4.0$ for the lower range and $f/8.0$ for the higher range.

Both examples cover a semi-angular field varying from 11½ degrees at minimum focal length $F_0$ to 2½ degrees at maximum focal length $F_m$ in the lower range, and from 5¾ degrees at minimum focal length $F_0^1$ to 1¼ degrees at maximum focal length $F_m^1$ in the higher range.

The iris diaphragm is located .025 in front of the surface $R_{12}$ in both examples and has diameter $.518F_0$ in Example II and $.522F^0$ in Example III. The back focal distance is $2.908F_0$ in Example II, and $2.929F_0$ in Example III.

In these two examples, the front assembly is substantially afocal throughout the range of movement and comprises three members, of which the front and rear members each consist of a convergent doublet component, whilst the middle member consists of a divergent doublet component followed by a divergent simple component. The movements of these members, controlled by a "zoom" control element, are fully described in the specification of the copending United States application Serial No. 78,744, now patent 3,164,664, above mentioned, the divergent middle member being driven at a rate bearing a linear relationship to the movement of the zoom control element in a rearward direction during the change from minimum equivalent focal length to maximum equivalent focal length, and at the same time the front and rear members are driven by the zoom control element through a single cam, so that they first move away from one another and then move back again to their starting positions. The movements are such as to give a rate of change of the equivalent focal length of the whole objective following an approximation to a logarithmic law, whereby the size of the resultant image changes at a relatively steady rate in accordance with the movement of the zoom control element.

Focussing for near object positions is effected, as in the first example, by an additional forward movement of the front member of the front assembly under the control of a focussing control element. The minimum object distance which can be satisfactorily accommodated by these examples is of the order of $36F_0$, and provision is made for a maximum focussing movement of about $.43F_0$ in Example II and $.39F_0$ in Example III to provide for such object distance, the equivalent focal length $f_1$ of the front member of the front assembly having the values $+3.704F_0$ in Example II and $+3.553F_0$ in Example III. The equivalent focal lengths $f_2$ and $f_3$ respectively of the middle and rear members of the front assembly are $-1.031F_0$ and $+3.405F_0$ in Example II and $-1.000F_0$ and $+3.289F_0$ in Example III.

The rear assembly in both examples comprises a stationary front member, an adjustable middle member and a stationary rear member. The front member consists of a convergent simple component having an aspheric front surface and has equivalent focal length $f_f$ equal to $+2.557F_0$ in Example II and $+2.580F_0$ in Example III. The adjustable middle member consists of a divergent doublet component having equivalent focal length $f_m$ equal to $-1.011F_0$ in Example II and $-1.020F_0$ in Example III. The stationary rear member consists of a convergent doublet component followed by a convergent simple component, and has equivalent focal length $f_r$ equal to $+1.399F_0$ in Example II and $+1.403F_0$ in Example III.

The divergent middle member is adjustable from one to the other of two preset positions, in the manner already described with reference to Example I, the movement being $0.715F_0$ in Example II and $0.721F_0$ in Example III. In this way, as has been explained, it is possible to get two ranges of variation of the equavilent focal length of the objective, with the same image plane and without movement of the front and rear members of the rear assembly.

This rear assembly in all three examples, when adjusted for the lower of the two ranges has an inverted telephoto characteristic, with the effective axial beam diameter in the rear assembly much greater at its rear surface than at its front surface, as will be clear from the tables above given, whilst when adjusted for the higher range it has a telephoto characteristic. The arrangement is such that the stationary rear member of the rear assembly always receives a divergent beam in both positions of adjustment of the middle member and throughout the zooming movement in the front assembly. Thus the front and middle members of the rear assembly can be regarded as cooperating with the front assembly to constitute a divergent group, whose equivalent focal length varies during the zooming movement but bears a constant ratio to the equivalent focal length of the complete objective, this ratio being .813 in Example I, .880 in Example II and .879 in Example III. These ratios are the same for both ranges of variation. This divergent group produces a virtual image of the object in a constant position lying at a distance in front of the front surface of the stationary rear member equal to 2.4933 in Example I, $2.5171F_0$ in Example II and $2.5398F_0$ in Example III.

The rear nodal point of this divergent group varies in position during the zooming movement. In the lower range of variation of the equivalent focal length, the position of this nodal point varies in Example I, from $.923F_0$ in front of the rear surface of the group (that is the rear surface of the middle member of the rear assembly) at the lower end of the range to $2.331F_0$ behind such rear surface at the upper end of the range, the position at the mid-point of the range (that is when the value of the equivalent focal length of the objective is the geometric mean between the minimum and maximum values, this being the point in the range at which the front and rear members of the front assembly are furthest apart from one another) being $.083F_0$ behind the said rear surface. The corresponding positions of this nodal point in Examples II and III are respectively $.872F_0$ and $.889F_0$ in front of the rear surface at the minimum end of the range, $2.647F_0$ and $2.629F_0$ behind the rear surface at the maximum end of the range, and $.215F_0$ and $.198F_0$ behind the rear surface at the mid-point of the range.

The front nodal point of the rear member of the rear assembly is at a position $.125F_0$ in Example I, $.113F_0$ in Example II and $.096F_0$ in Example III behind the front surface of such rear member. Thus, allowing for the axial separation between such front surface and the rear surface of the middle member of the rear assembly, namely $.757F_0$ in Example I, $.765F_0$ in Example II and $.772F_0$ in Example III, the axial separation between the rear nodal point of the divergent group and the front nodal point of the rear member of the rear assembly at the mid-point of the lower range of variation amounts to $.799F_0$ in Example I, $.663F_0$ in Example II and $.670F_0$ in Example III.

As is fully explained in the specifications of the copending applications above mentioned, the objective in these examples is well corrected throughout the two ranges of variation of the equivalent focal length for all the aberrations and has a long back focal distance amounting to $3.106F_0$ in Example I, $2.908F_0$ in Example II and $2.929F_0$ in Example III. Since the primary advantage of such long back focal distance is to provide adequate accommodation for filters or reflectors or other equipment between the rear surface of the objective and the resultant image plane, it is the absolute value of such back focal distance, in relation to the size of the image-receiving area in the image plane, that is of chief importance. A desired back focal distance can of course always be obtained by scaling up the equivalent focal length of the objective, but it is clearly of no interest in practice to increase the equivalent focal length values too much in relation to the size of the image-receiving area, and a practical limit in this respect may be specified, namely that the minimum value of equivalent focal length should not be greater than four times the length of the diagonal of the image-receiving area.

Thus, in a practical instance, with an image-receiving area having a diagonal of 1.6 inches, very satisfactory results can be obtained, if $F_0$ is chosen to be, say 4 inches, thus giving two ranges of variation of the equivalent focal length from 4 to 20 inches and from 8 to 40 inches, the back focal distance then having the exceptionally large value of 12.4 inches in Example I, 11.6 inches in Example II and 11.7 inches in Example III. In such case, a range of object distances from infinity down to about 12 feet can be satisfactorily covered. An objective with such dimensions in accordance with one or other of these examples, is very suitable for use in the various alternative constructions of camera arrangement now to be described.

The first construction, shown diagrammatically in FIGURES 4-6, is for a television camera intended more especially for outdoor use, for which an object distance range from infinity down to 12 feet is usually fully adequate. The construction is of course also useful for that part of studio work not calling for shorter object distances.

In this construction, the objective A in its mount is disposed on one side of the lower half of a casing B, indicated diagrammatically by a dotted line. Such casing B may be of rectangular shape as shown or, if preferred, may be of cylindrical or other shape. The zooming control element and the focussing control element are connected to suitable hand-controls indicated respectively at $A^1$ and $A^2$ outside the casing B as also is an element $A^3$ for controlling adjustment of the middle member of the rear assembly from one to the other of its two preset positions. The longitudinal position of the objective in the casing is such that the front member of the front assembly when occupying its most forward position, will lie just behind an aperture in the front wall of the casing.

The other side of the lower half of the casing B is utilised for holding the image orthicon or other signal-generating tube C, which thus lies side by side with the objective A with its axis parallel to the optical axis of the objective A and with its image-receiving rear surface indicated at $C^1$ approximately in the same plane with the vertex of the rear surface of the objective. Behind these two rear surfaces are mounted two reflectors D, $D^1$ each inclined at 45 degrees to the axis, so that the beam emergent from the rear surface of the objective is deflected through a right angle and then again through a further right angle so as to be incident from the rear on to the image-receiving area $C^1$ on the rear surface of the signal-generating tube C. The long back focal distance afforded by the objective is adequate to accommodate these two reflectors D, $D^1$ between the rear surface of the objective A and the image-receiving area $C^1$ on the tube C. A filter turret indicated at $D^2$ may be provided, for example, between the two reflectors.

In the upper half of the casing, a sighting device, which may take the form of a view-finding telescope or, as shown, of the monitor tube E of an electronic viewfinder, is mounted above the objective and has its eyepiece or screen in a convenient position for use by the operator, and a unit F incorporating the electrical equipment associated with the signal-generating tube C for controlling the television transmission (and of the monitor tube E, if used) is similarly mounted above the tube C.

In this way, it becomes possible to house in a convenient and easily manoeuvrable casing the various units of a television camera incorporating a highly efficient objective of the zoom type giving two ranges of variation of equivalent focal length and suitable for meeting the requirements of outdoor camera work.

The objective above described, with its high standard of aberration correction and its long back focal distance, also makes it possible to provide a greatly improved television camera for colour operation, for which hitherto it has been necessary to employ a copying objective for relaying the image, in order to provide accommodation for the colour filters and beam splitting devices, with the much lower standard of aberration correction rendered unavoidable by the use of such copying objective and the accompanying field lens.

For such purpose, the camera may be arranged in various ways, but in one arrangment, shown diagrammatically in FIGURE 7, two of the three colour-partial image-receiving signal-generating tubes $G^1$, $G^2$ are mounted one on either side of the objective A within the camera casing B, with their image-receiving areas $G^4$, $G^5$ at their rear ends by the side of the rear end of the objective, and the third $G^3$ is mounted behind one of the first two with its image-receiving area $G^6$ at its front end. Immediately behind the rear surface of the objective A is mounted a beamsplitter H comprising two isosceles right-angled prisms with their hypotenuse surfaces in contact, such contact surface being rendered partially reflecting, and colour selective, so that part of the beam associated with one of the three colours is transmitted straight through the square prism block, whilst the remainder is reflected at right angles. The transmitted part of such beam is deflected twice at right angles by reflectors $H^1$, $H^2$ so as to be incident on the image-receiving area $G^4$ at the rear end of the signal-generating tube G1 at the side of the objec- of the signal-generating tube $G^1$ at the side of the objective. The reflected part of the beam is incident on a the signal-generating tubes $G^2$ at the side of the objective, so that part associated with the second colour is reflected at right angles to the image-receiving area $G^5$ of such tube, whilst part associated with the third colour is transmitted to be deflected by a reflector $H^4$ at right angles in the opposite direction to the image-receiving area $G^6$ of the third signal-generating tube $G^3$. The axial positions of the three tubes $G^1$, $G^2$, $G^3$ are arranged to be such that their image-receiving areas $G^4$, $G^5$, $G^6$ are at the correct effective distance from the rear surface of the objective A. An appropriate colour filter (not shown) for trimming purposes may be mounted in the path of the beam to each of the three tubes $G^1$, $G^2$, $G^3$ after such beam has passed through the beam-splitter or beam-splitters. The remaining space within the casing is utilised to accommodate a sighting device E and the electrical equipment F associated with the three tubes (and with the electronic view-finder, if used).

It will be clear that this arrangement can be modified in a variety of ways to accommodate the three signal-generating tubes in different positions relatively to the objective, if desired. For example, the objective, two of the signal-generating tubes and the sighting device may be arranged side by side in square formation, in a manner analogous to that of the first arrangement above described, with the third signal-generating tube behind one of the first two, and with the electrical equipment by the side of such third tube.

These arrangements have been described with reference to their use in television cameras, but it will be appreciated that generally analogous arrangements can be employed in cinematograph cameras. Thus, as shown in FIGURES 8–10, the film gate may be mounted with its image-receiving area J in the same position as that occupied by the image-receiving area of the signal-generating tube, the remaining space occupied by such tube and by the associated electrical equipment then being available to house the film gate mechanism $J^1$ and the supply and take-up spools K, $K^1$ and the driving mechanism therefor, constituting the remainder of the image-receiving unit appropriate to a cinematograph camera. The various arrangements can in other respects be similar to the corresponding television camera arrangements. It should be mentioned that in such a cinematograph camera arrangement, the angular position of the image-receiving area J relative to the optical axis of the objective A can be altered, if desired, in which case the beam emergent from the rear surface of the objective would be deflected through some angle other than two right angles.

As has been mentioned, the foregoing arrangements, when used with an image-receiving area having a diagonal of 1.6 inches, are suitable for use with object distances from infinity down to 12 feet. For studio work, however, it is usually desirable to provide for shorter object distances, for example for "close-ups," down to say, 3 feet. The foregoing arrangements can all be modified to provide for this, by incorporating the invention forming the subject of the above-mentioned copending United States patent application Serial No. 78,744, now patent 3,164,664 (corresponding British patent application No. 61 of 1960), according to which a wide angle attachment is provided in front of the objective. This can readily be achieved by mounting such wide angle attachment on the front of the camera casing, so that it can be moved, when required, from an inoperative position into an operative position in which it lies directly in front of the objective.

Numerical data for wide angle attachments suitable for use in front respectively of the above Examples II and III and illustrated respectively in FIGURES 11 and 12 are given in the following tables.

*Example IIA*

| Radius | Thickness or Air Separation | Refractive Index $n_d$ | Abbé V Number | Clear Diameter |
|---|---|---|---|---|
| $R_{a1}=+15.4705$ | $D_{a1}=0.23059$ | 1.70035 | 30.28 | 1.704 |
| $R_{a2}=-2.1140$ | $D_{a2}=0.07007$ | 1.51899 | 60.42 | |
| $R_{a3}=+0.8971$ | $S_{a1}=1.94861$ | | | 1.310 |
| $R_{a4}=-3.2665$ | $D_{a3}=0.07644$ | 1.70035 | 30.28 | 1.379 |
| $R_{a5}=+24.9804$ | $D_{a4}=0.22040$ | 1.61342 | 59.27 | |
| $R_{a6}=-1.4543$ | | | | 1.433 |

The dimensions of the variable air space between the rear surface of the attachment and the front surface of the objective are as follows:

|  | ∞ Object Distance | Minimum Object Distance |
|---|---|---|
| $F = F_0$ | 0.9772 | 0.5524 |
| $F = \sqrt{F_0 F_m}$ | 0.6249 | 0.2000 |
| $F = F_m$ | 0.9772 | 0.5524 |

*Example IIIA*

| Radius | Thickness or Air Separation | Refractive Index $n_d$ | Abbé V Number | Clear Diameter |
|---|---|---|---|---|
| $R_{a1} = +15.1791$ | | | | |
|  | $D_{a1} = .22625$ | 1.70035 | 30.28 | 1.672 |
| $R_{a2} = -2.0742$ | | | | |
|  | $D_{a2} = .06875$ | 1.51899 | 60.42 | |
| $R_{a3} = +0.8802$ | | | | 1.285 |
|  | $S_{a1} = 1.9119$ | | | |
| $R_{a4} = -3.2050$ | | | | 1.353 |
|  | $D_{a3} = .75$ | 1.70035 | 30.28 | |
| $R_{a5} = +24.5098$ | | | | |
|  | $D_{a4} = .21625$ | 1.61342 | 59.27 | |
| $R_{a6} = -1.4269$ | | | | 1.406 |

The dimensions of the variable air space between the rear surface of the attachment and the front surface of the objective are as follows:

|  | ∞ Object Distance | Minimum Object Distance |
|---|---|---|
| $F = F^0$ | .93075 | .5415 |
| $F = \sqrt{F_0 F_m}$ | .58925 | .20 |
| $F = F_m$ | .93075 | .5415 |

In both examples, the wide angle attachment is afocal and has a telescopic power of 2. This has the effect of giving to the complete optical system equivalent focal lengths half those of the objective alone and also angles of view twice those of the objective alone.

In both examples, the attachment consists of a divergent doublet component spaced in front of a convergent doublet component. The equivalent focal length of the front component is $-2.2677F_0$ in Example IIA and $-2.225F_0$ in Example IIIA, and that of the rear component is $+4.5354F_0$ in Example IIA and $+4.45F_0$ in Example IIIA. For the afocal condition, the separation between the adjacent nodes of the two components must be equal to the difference between their equivalent focal lengths.

Focussing for object distance is still effected by movement of the front member of the front assembly of the objective. When the objective is focused for infinity the beam between the attachment and the objective is collimated, so that the beam in front of the attachment must also be collimated and the complete system therefore remains focussed for infinity. When, however, the front member of the front assembly is moved forward to focus on a nearer distance, the beam behind the attachment has the corresponding degree of divergence and owing to the convergence of the rear member of the attachment the beam between the two members of the attachment is more strongly divergent. The front member of the attachment is, however, not strong enough to restore the original degree of divergence, so that the object distance for the complete system corresponding to a given focussing movement of the front member of the front assembly is shorter than that corresponding to the same focussing movement when the attachment is not in place. The equation defining the new object distance when the attachment is in use is $$D_A = D_0(p-1) - f_{A2}/p^2$$

Where $D_A$ is the new object distance measured from the front node of the front member of the attachment, $D_0$ is the original object distance for the objective alone measured from the stationary position of the rear node of the rear member of the attachment, $p$ is the telescopic power of the attachment and $f_{A2}$ is the equivalent focal length of the rear member of the attachment. Thus, for example, when the front member of the front assembly of the objective has been moved forward to the position of minimum object distance, $D_0$ is equal to $36F_0$, which as mentioned above corresponds to 12 feet when $F_0$ is 4 inches. Since $p=2$ in both examples and $f_{A2}$ is $+4.5354F_0$ in Example IIA and $+4.45F_0$ in Example IIIA, $D_A$ becomes $7.87F_0$, that is 31 inches when $F_0 = 4$ inches.

Thus, the provision of the wide angle attachment makes it possible to obtain four ranges of variation of the equivalent focal length of the objective, namely two ranges without the attachment respectively from 4 to 20 inches and from 8 to 40 inches and two ranges with the attachment respectively from 2 to 10 inches and from 4 to 20 inches. The range from 4 to 20 inches without the attachment has a relative aperture $f/4.0$ and gives a minimum object distance of 12 feet, whilst the similar range from 4 to 20 inches with the attachment has relative aperture $f/8.0$ and can focus down to an object distance of 31 inches, thus giving two settings with the same focal length range but with different operational advantages. The camera with the wide angle attachment thus provides what is required for studio work, in addition to the use for outdoor work with the wide angle attachment out of operation.

In each of the ranges provided by the objective alone, the ratio of maximum equivalent focal length to the f/number is $1.25F_0$. The clear diameter of the rear surface of the attachment is $1.433F_0$ or 1.143 times such ratio in Example IIA and $1.406F_0$ or 1.125 times such ratio in Example IIIA. The equivalent focal length $f_{A2}$ of the rear component of the attachment is 3.628 times such ratio in Example IIA and 3.56 times such ratio in Example IIIA.

The convergent rear component of the attachment consists of a divergent element in front of a convergent element. The rear surface of the component is concave to the front with radius of curvature $0.32f_{A2}$ in both examples. The internal contact surface is slightly convex to the front with radius of curvature $5.5f_{A2}$ in both examples. The two elements are made of materials having mean refractive indices differing by .087 and Abbé V numbers differing by 29 in both examples.

The divergent front component of the attachment consists of a convergent element in front of a divergent element. The rear surface is convex to the front with radius of curvature $.40f_{A1}$ in both examples, $f_{A1}$ being the equivalent focal length of this front component. The internal contact surface is concave to the front with radius of curvature $.93f_{A1}$ in both examples. The two elements are made of materials having mean refractive indices differing by .181 and Abbé V numbers differing by 30 in both examples.

The wide angle attachement in these examples has the advantages of being small and light in construction and of not introducing objectionable aberration or light absorption, since it avoids steep surface curvatures and large glass thicknesses and maintains reasonably good aberration correction, especially for distortion, notwithstanding the variations of angular field and width of beam resulting from the relative movements in the front assembly of the objective.

In each of FIGURES 11 and 12, the front surface $R_1$ of the objective itself is indicated behind the attachment to show the position of the attachment relatively to the objective. The full line position of the surface $R_1$ is that occupied at the minimum end of the range of variation of equivalent focal length, with the objective focussed at infinity. The dotted line position of such surface, indicated at $R_1$, is the most forward position of the surface, namely that occupied at the intermediate position of the range of variation in which $F=\sqrt{F_0 F_m}$, with the objective focussed for minimum object distance.

Such wide angle attachment can be used in front of the objective in any of the camera constructions according to the invention, and FIGURE 13 illustrates the arrangement by way of example as applied to the construction of FIGURES 4-6. Whilst the attachment L may be mounted outside the front end wall of the casing B, in front of the objective A, it is sometimes convenient, as shown in FIGURE 13, to extend the casing B and to mount the objective within the casing. In either case, the attachment L is so mounted, for example on rails (not shown) that it can be moved from an operative position, shown in full line in FIGURE 13, in front of the objective into an inoperative position, shown in dotted line at $L^1$ in FIGURE 13, in which it lies out of the path of the rays, for example in front of the tube C.

It is to be understood that the camera arrangements above described have been given by way of example only and that the invention may be carried into practice in other ways. Thus, for instance, the invention is not limited to the use of an objective giving two ranges of variation of the equivalent focal length, and various relative dispositions of the parts within the camera casing other than those described are permissible with the scope of the invention.

What I claim as my invention and desire to secure by Letters Patent is:

1. A camera arrangement, for example for television, comprising a casing, an image-receiving unit having an image-receiving area of generally rectangular shape, an optical objective of variable equivalent focal length, the minimum value $F_0$ of which is not greater than 4 times the length of the diagonal of the image-receiving area, and having front and rear assemblies, of which the front assembly includes members relatively movable for effecting variation of the equivalent focal length of the objective whilst maintaining the resultant image position constant throughout the range of relative movement, whilst the rear assembly has an inverted telephoto characteristic with effective axial beam diameter greater at its rear surface than at its front surface and includes a stationary convergent rear member having equivalent focal length $f_r$ and in front thereof at least one member which cooperates with the front assembly to form a divergent group whose equivalent focal length bears to the equivalent focal length of the complete objective a constant ratio lying between $f_r/F_0$ and $f_r/3F_0$, such divergent group acting to produce a virtual image of the object in a constant position lying between $f_r$ and $4f_r$ in front of the front surface of the said convergent rear member, whereby such rear member always receives a divergent beam and forms from such virtual image a resultant image of the object at a back focal distance behind the rear surface of the convergent rear member greater than 6 times the length of the diagonal of the image-receiving area, means for mounting the image-receiving unit and the optical objective side by side within the camera casing with the image-receiving area at the rear end of the image-receiving unit, and means for deflecting the image-forming beam emergent from the rear surface of the objective to cause it to be incident on the image-receiving area at an effective distance from the rear surface of the objective equal to the back focal distance of the objective.

2. A camera arrangement as claimed in claim 1, in which, in the mid-position of the relative movement (that is in the position at which the value of the equivalent focal length of the objective is equal to the geometric mean between its maximum and minimum values), the rear nodal point of the divergent group in front of the convergent rear member of the rear assembly is axially separated from the front nodal point of such rear member by a distance lying between $+f_r$ and $-f_r/3$, such axial separation being reckoned positive if the rear nodal point of the divergent group lies in front of the front nodal point of the rear member and negative if the said rear nodal point lies behind the said front nodal point.

3. A camera arrangement as claimed in claim 2, including a sighting device, and means for mounting such device in the camera casing by the side of the objective and the image-receiving unit.

4. A camera arrangement as claimed in claim 3, in which the image-receiving unit consists of a signal-generating tube acting to generate electrical signals in accordance with the received optical image, and a unit incorporating electrical equipment associated with such tube is mounted by the side of the objective and the tube.

5. A camera arrangement as claimed in claim 4, including means whereby the optical objective can be caused to give at least two alternative ranges of variation of the equivalent focal length of the objective without alteration of the resultant image position.

6. A camera arrangement as claimed in claim 5, including a wide angle attachment, means for mounting such attachment at the front end of the camera casing so that it can be moved at will from an inoperative position to an operative position in front of the front surface of the objective.

7. A camera arrangement as claimed in claim 2, for operation in colour, including three colour-partial image-receiving units each with its own image-receiving area, means for mounting such units within the camera casing with at least one of the units by the side of the objective, and beam-splitting and colour-filtering means interposed in the path of the beam emergent from the objective for splitting such beam and deflecting it respectively to the three image-receiving areas to give equal effective optical path lengths from the rear surface of the objective to such image-receiving areas.

8. A camera arrangement as claimed in claim 7, including means whereby the optical objective can be caused to give at least two alternative ranges of variation of the equivalent focal length of the objective without alteration of the resultant image position.

9. A camera arrangement as claimed in claim 2, in which the rear assembly comprises in addition to the stationary convergent rear member, a stationary front member, and a divergent middle member adjustable from one to the other of two preset positions in which such middle member has the same conjugates, whereby in such two preset positions of the middle member the relative movement of the members of the front assembly will produce two different ranges of variation of the equivalent focal length of the objective with the same position of the resultant image plane the magnifications of the divergent middle member of the rear assembly in its two preset positions respectively being $\sqrt{M}$ and $1\sqrt{M}$, where M is the ratio between the values of the equivalent focal lengths of the objective in the two ranges, the rear assembly having an inverted telephoto characteristic in respect of the lower of the two ranges and a telephoto characteristic in respect of the upper range.

10. A camera arrangement as claimed in claim 1, including means whereby the optical objective can be caused to give at least two alternative ranges of variation of the equivalent focal length of the objective without alteration of the resultant image position.

11. A camera arrangement as claimed in claim 10, including a wide angle attachment, means for mounting such attachment at the front end of the camera casing so that it can be moved at will from an inoperative position to an operative position in front of the front surface of the objective.

12. A camera arrangement as claimed in claim 11, in which the wide angle attachment is substantially afocal and, when in use, is maintained in a constant position, focussing of the objective for different object distances being effected by movement of at least one member of the objective independent of the relative movements for effecting variation of the equivalent focal length.

13. A camera arrangement as claimed in claim 12, for television, in which the image-receiving unit consists of a signal-generating tube acting to generate electrical signals in accordance with the received optical image, and including an electronic sighting device, a unit incorporating electrical equipment associated with the signal-generating tube and with the sighting device, and means for mounting the sighting device and such equipment unit within the casing by the side of the objective and the signal-generating tube.

14. A camera arrangement as claimed in claim 1, including a wide angle attachment, means for mounting such attachment at the front end of the camera casing so that it can be moved at will from an inoperative position to an operative position in front of the front surface of the objective.

15. A camera arrangement as claimed in claim 14, in which the wide angle attachment comprises a divergent compound component axially spaced in front of a convergent compound component.

16. A camera arrangement as claimed in claim 15, in which the clear diameter of the convergent rear component of the attachment lies between 1.0 and 1.25 times the ratio of the maximum value of the equivalent focal length of the objective to the $f$/number of the objective.

17. A camera arrangement as claimed in claim 16, in which the equivalent focal length of the convergent rear component of the attachment lies between 2.5 and 5.0 times the ratio of the maximum value of the equivalent focal length of the objective to the $f$/number of the objective.

18. A camera arrangement as claimed in claim 15, in which the convergent rear component of the attachment consists of a doublet having a divergent element in front of a convergent element, and the rear surface of such component is concave to the front with radius of curvature between 0.2 and 0.5 times the equivalent focal length of such rear component.

19. A camera arrangement as claimed in claim 15, in which the convergent rear component of the attachment consists of a doublet having a divergent element in front of a convergent element, the internal contact in such component having radius of curvature greater than 2.0 times the equivalent focal length of such component, the mean refractive index of the material of the divergent front element of such component exceeding that of the convergent element thereof by between 0.05 and 0.20.

20. A camera arrangement as claimed in claim 15, in which the divergent front component of the attachment consists of a doublet having a convergent element in front of a divergent element, and the rear surface of such component is convex to the front with radius of curvature between 0.25 and 0.6 times the equivalent focal length of such front component.

21. A camera arrangement as claimed in claim 15, in which the divergent front component of the attachment consists of a doublet having a convergent element in front of a divergent element, the internal contact in such component being concave to the front with radius of curvature between 0.5 and 2.0 times the equivalent focal length of such component, the mean refractive index of the material of the convergent front element thereof exceeding that of the divergent rear element thereof by between 0.1 and 0.25.

References Cited by the Examiner

UNITED STATES PATENTS

| | | | |
|---|---|---|---|
| 2,757,232 | 7/56 | Goodale | 178—5.4 |
| 2,854,885 | 10/58 | Robinson et al. | 178—7.92 |
| 2,854,901 | 10/58 | Fathauer | 178—7.92 |
| 2,971,051 | 2/61 | Back | 178—5.4 |
| 3,017,454 | 1/62 | James et al. | 178—5.4 |

FOREIGN PATENTS 1,195,263  11/59  France.

DAVID G. REDINBAUGH, *Primary Examiner.*

STEPHEN W. CAPELLI, ROBERT SEGAL, *Examiners.*